(12) United States Patent
Carter et al.

(10) Patent No.: US 8,934,024 B2
(45) Date of Patent: Jan. 13, 2015

(54) EFFICIENT, USER-FRIENDLY SYSTEM TO STREAM SCREENS INSIDE VIDEO USING A MOBILE DEVICE

(75) Inventors: Scott Carter, Los Altos, CA (US); Laurent Denoue, Palo Alto, CA (US); John Adcock, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 872 days.

(21) Appl. No.: 12/687,831

(22) Filed: Jan. 14, 2010

(65) Prior Publication Data

US 2011/0169976 A1 Jul. 14, 2011

(51) Int. Cl.
| | |
|---|---|
| H04N 5/228 | (2006.01) |
| H04N 5/262 | (2006.01) |
| H04N 5/222 | (2006.01) |
| G06K 9/36 | (2006.01) |
| H04N 21/41 | (2011.01) |
| H04N 21/414 | (2011.01) |
| H04N 21/4223 | (2011.01) |
| H04N 21/4728 | (2011.01) |
| H04N 7/14 | (2006.01) |

(52) U.S. Cl.
CPC ..... *H04N 21/4126* (2013.01); *H04N 21/41407* (2013.01); *H04N 21/4223* (2013.01); *H04N 21/4728* (2013.01); *H04N 2007/145* (2013.01)
USPC ............ 348/222.1; 348/239; 348/333.12; 382/289

(58) Field of Classification Search
CPC . H04N 5/2393; H04N 2101/00; H04N 5/272; G06T 3/0093; G06T 2210/44
USPC ............... 348/14.01–14.16, 222.1, 348/208.99–208.16, 239, 333.01–333.05, 348/376, 211.1–211.9, 211.13–211.14; 382/276–308, 312–313
See application file for complete search history.

(56) References Cited

U.S. PATENT DOCUMENTS

| | | | |
|---|---|---|---|
| 5,686,960 A * | 11/1997 | Sussman et al. ............ | 348/218.1 |
| 6,488,583 B1 * | 12/2002 | Jones et al. ..................... | 463/34 |
| 7,116,342 B2 | 10/2006 | Dengler et al. | |
| 8,085,302 B2 * | 12/2011 | Zhang et al. .................. | 348/169 |
| 8,159,518 B2 * | 4/2012 | Underwood et al. ...... | 348/14.01 |
| 8,218,830 B2 * | 7/2012 | Gavin et al. .................. | 382/118 |
| 8,345,106 B2 * | 1/2013 | Nijemcevic et al. ....... | 348/207.1 |
| 2005/0104849 A1 * | 5/2005 | Hoile ............................ | 345/157 |

(Continued)

OTHER PUBLICATIONS

Mi Zhang et al., "OCRDroid: A Framework to Digitize Text on Smart Phones", MobiCase, 2009.

(Continued)

*Primary Examiner* — Pritham Prabhakher
(74) *Attorney, Agent, or Firm* — Sughrue Mion, PLLC

(57) ABSTRACT

A system helps filter and correct video captured and streamed from a mobile device. In particular, the system detects and streams content shown on screens, allowing anyone to stream screen content immediately without needing to develop hooks into external software (i.e. without installing a screen recorder software in the computer). The system can use a variety of user-selectable techniques to detect the screen, and utilizes the mobile device's touchscreen to allow users to manually override detected corners. However, some of these approaches could potentially be applied to other types of content, such as identifying TV screens, appliance LCD screens, other mobile devices' screens, multifunction devices. (e.g. a remote technician could help troubleshoot a malfunctioning MFD by having the end-user point his cellphone to the LCD screen of the MFD).

21 Claims, 6 Drawing Sheets

(56) References Cited

U.S. PATENT DOCUMENTS

| | | | |
|---|---|---|---|
| 2005/0190202 A1* | 9/2005 | Suzuki et al. | 345/660 |
| 2005/0278636 A1* | 12/2005 | Nomoto | 715/724 |
| 2006/0188173 A1* | 8/2006 | Zhang et al. | 382/276 |
| 2007/0120979 A1* | 5/2007 | Zhang et al. | 348/154 |
| 2007/0236451 A1* | 10/2007 | Ofek et al. | 345/157 |
| 2008/0132163 A1* | 6/2008 | Ilan et al. | 455/3.06 |
| 2008/0231684 A1* | 9/2008 | Underwood et al. | 348/14.01 |
| 2008/0266405 A1* | 10/2008 | Tachibana et al. | 348/208.6 |
| 2009/0015703 A1* | 1/2009 | Kim et al. | 348/333.12 |
| 2009/0180689 A1* | 7/2009 | Komiya et al. | 382/167 |
| 2010/0049711 A1* | 2/2010 | Singh et al. | 707/6 |
| 2011/0069180 A1* | 3/2011 | Nijemcevic et al. | 348/207.1 |

OTHER PUBLICATIONS

Qiong Liu et al., Document Finder, Oct. 26-31, 2008, p. 1015-1016, Vancouver, British Columbia, Cananda.

* cited by examiner

EFFICIENT, USER-FRIENDLY SYSTEM TO STREAM SCREENS INSIDE VIDEO USING A MOBILE DEVICE

BACKGROUND

1. Field of the Invention

This invention relates in general to systems and methods for using mobile devices and, in particular, systems and methods for streaming content of displays inside video using a mobile device.

2. Description of the Related Art

As the processing power of mobile devices improves, they are being used for more computationally intensive tasks. Lately, some services have begun to offer live video streaming from mobile devices (e.g., Qik, Justin.Tv), potentially allowing anyone to stream any event anywhere at anytime. However, as one has seen in the desktop world, unfiltered streaming, while useful, is not appropriate for every task. By filtering streamed content, presenters can better focus the audience's attention, improve bandwidth efficiency, and mitigate privacy concerns. Furthermore, mobile content faces other challenges not present on desktops—for example the recording device may be off-axis from the intended recorded content, and suffer from stability problems as the recording devices often are handheld. While some mobile applications support streaming video, and others support streaming content that is displayed on a display screen (i.e., streaming screen content), no application yet supports streaming screen content via mobile video.

There is a need for systems and methods that allow users to capture and stream screen content captured via video cameras embedded in mobile devices.

SUMMARY OF THE INVENTION

In accordance with one aspect of certain embodiments of the present invention, there is provided a computer-implemented method for streaming a content of a display and the method being performed by a mobile device. The method may include capturing a video frame using a camera of the mobile device, detecting an area within the video frame corresponding to a display, and processing the video frame based on the detected area. The processing may include identifying a portion of the video frame within the detected area and producing an image of the identified portion of the video frame within the detected area; and transmitting the produced image.

In accordance with another aspect of certain embodiments of the present invention, there is provided a mobile device which includes a camera recording video frames; a screen detection unit detecting a screen through the camera; a deskew unit deskewing the video frames with respect to the detected screen; a processing unit processing the video frames, the processing comprising identifying the detected screen in the video frames; and a transmitting unit transmitting processed video frames to a remote server.

In accordance with another aspect of certain embodiments of the present invention, there is provided a computer-readable medium embodying a set of instructions, which, when executed by one of more processing units of a mobile device, cause the mobile device to perform a method. The method may include capturing a video frame using a camera of the mobile device; detecting an area within the video frame corresponding to a display; and processing the video frame based on the detected area. The processing may involve identifying a portion of the video frame within the detected area. The method may also include transmitting the processed video frame to a remote server.

In accordance with another aspect of certain embodiments of the present invention, there is provided a computer-implemented method for streaming a content of a display. The method may include capturing, by a mobile device, a video frame using a camera of the mobile device; transmitting the processed video frame from the mobile device to a remote server; detecting, at a remote server, an area within the video frame corresponding to a display; and processing, at a remote server, the video frame based on the detected area, the processing comprising identifying a portion of the video frame within the detected area.

Additional aspects related to embodiments of the invention will be set forth in part in the description which follows, and in part will be apparent from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

One or more embodiments of the invention concern a system that allows users to capture and stream screen content captured via video cameras embedded in mobile devices. The mobile application can use a variety of user-selectable techniques to detect the screen, and utilizes the mobile device's touchscreen to allow users to manually override detected corners.

In one or more embodiments of the invention, the system helps filter and correct video captured and streamed from a mobile device. The system in accordance with an embodiment of the invention focuses in particular on detecting and streaming content shown on screens, such as computer display screens or video display screens, allowing anyone to immediately stream the content displayed on a screen ("screen content") without needing to develop hooks into external software (i.e. without installing a screen recorder software in the computer). However, some of these approaches could potentially be applied to other types of content, such as identifying TV screens, appliance LCD screens, other mobile devices' screens, and screens of multifunction devices (e.g. a remote technician could help troubleshoot a malfunctioning MFD by having the end-user point his or her cellphone's camera at the LCD screen of the MFD).

Figure 1:
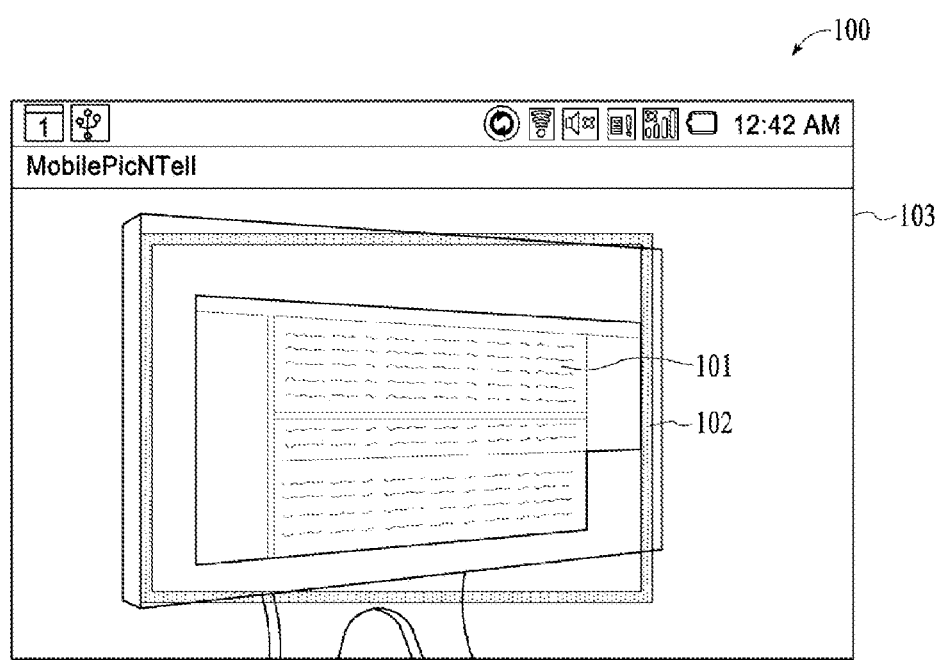
FIG. 1 illustrates an exemplary embodiment of the invention, wherein a display screen area is manually approximated using user's input.

Regardless of the screen detector used, screen boundaries are sometimes not detected perfectly. To accommodate for this, in one or more embodiments of the invention, a manual override mode allows users to directly specify the corners of a quadrilateral such as the corners of a display. Touching on a point on the mobile device screen sets the location of the corner closest to that point. Corners can also be dragged to different locations. Users can also double-tap the mobile device display to reset detected corners to the edges of the video frame. Finally, the system automatically sets the detected area to a rectangle 102 if the user in rapid succession specifies two corners corresponding to a diagonal of the rectangle (FIG. 1). This allows a user to set the detected area quickly when facing a display directly and there is little need for skew correction. FIG. 1 illustrates an exemplary embodiment 100 view of a screen of a mobile device 103 showing a video frame of display 101.

Figure 2:
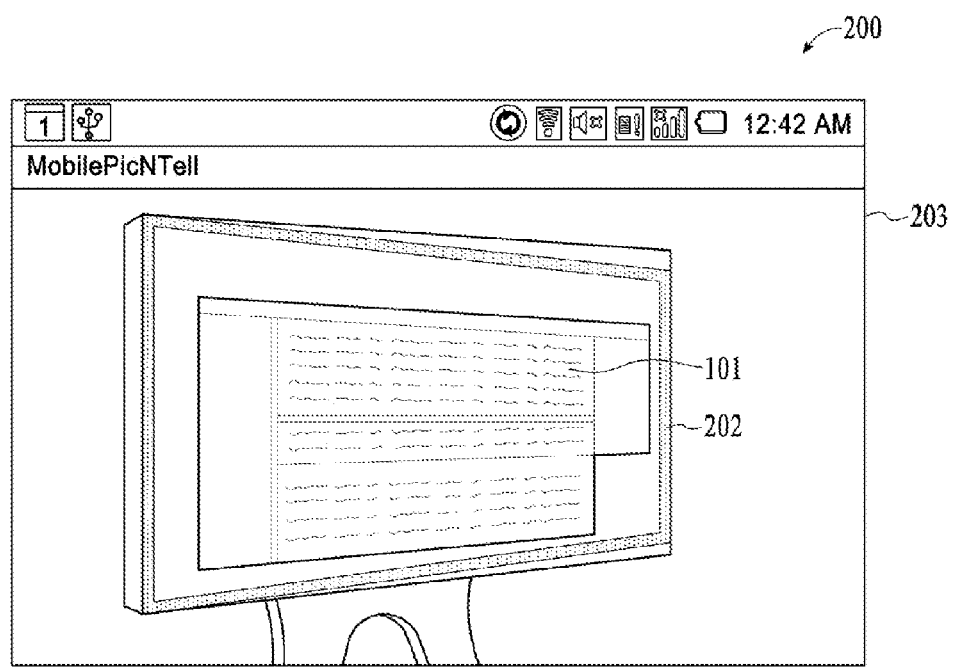
FIG. 2 illustrates an exemplary embodiment of the invention, wherein the screen area is automatically detected.

In the embodiment shown in FIG. 2, the screen boundary 202 has been automatically detected.

Figure 3:
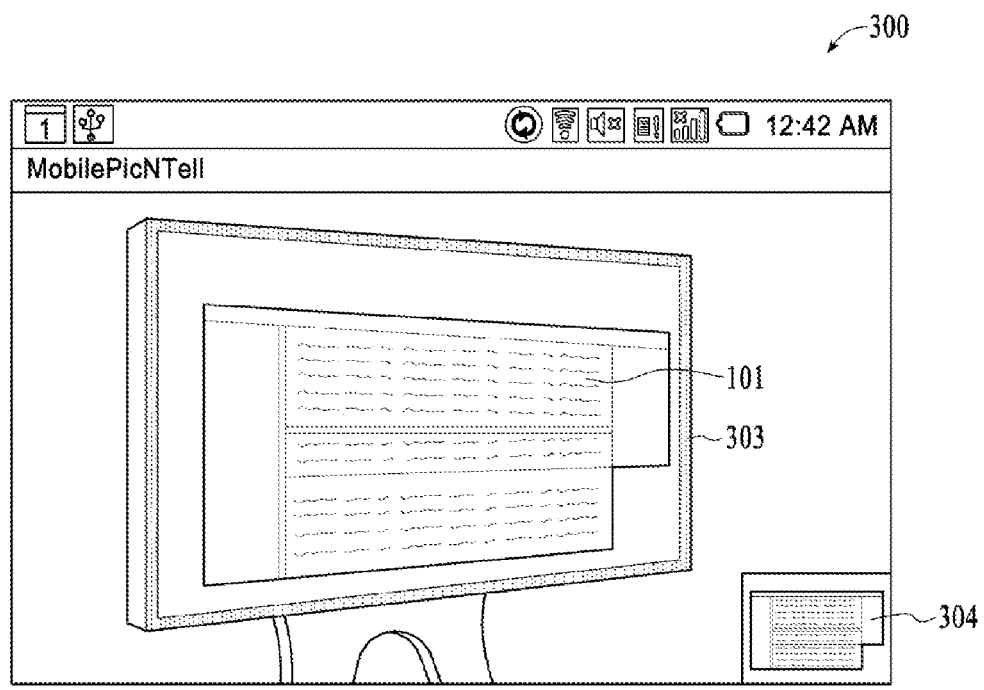
FIG. 3 illustrates an exemplary embodiment of the invention, wherein detected screen boundaries are locked and a preview of the screen is shown.

In one or more embodiments of the invention, when the user is satisfied that the coordinates of the screen 101 have been accurately detected or otherwise specified, she can press a button to "lock" that position (FIG. 3). When the coordinates are locked screen detection ceases, the screen boundary 303 no longer changes, and an un-warped preview of the screen 304 is presented in the lower right hand corner of the mobile device screen. This allows the user to see the actual image that is recorded or streamed as deskewed. Furthermore, the main thread of the application receives events from sensors on-board the mobile device in order to detect changes in the pose of the camera. If a change is detected, the application automatically exits locked mode and begins to redetect the screen. Users can also manually exit the lock mode at any time.

In another embodiment, the inventive system may incorporate the technique described in Mi Zhang, *OCRdroid: A Framework to Digitize Text Using Mobile Phones*, MobiCase '09, incorporated by reference herein, which uses the mobile phone's tilt sensor to prevent users from taking a picture of a receipt while the camera's plane is not parallel to the receipt's plane. The system also implements a fast line estimator to prevent users from taking a picture if the camera is not correctly rotated so that the receipt's lines are roughly horizontal in the camera frame. For example, once the screen has been detected, if the screen's plane is not parallel with the camera's plane, the system may prevent the user from taking a picture.

In one or more embodiments of the invention, optical motion correction can be used, in real-time or as a post-processing step to maintain the deskew region between explicit screen detections. In other embodiments, numerous other software-based image stabilization applications can be utilized to stabilize the acquired video. The step of locking the screen coordinates provides an anchor to which subsequent frames can be warped. That is, if the screen area is locked at frame 0, subsequent frames 1 . . . N can be aligned to this reference frame 0 with well known automatic image registration techniques (for instance by computing a transformation given a set of corresponding image coordinates, determined by matching sift features). In this way a single fix on the screen area can be used without losing the position due to camera motion. Because the screen area has been designated, the alignment can be performed specifically to stabilize the image of the screen. That is, only feature points within (or near) the boundaries of the designated screen area are used to match subsequent frames to the reference frame, insuring that the screen plane is the target of stabilization (rather than background objects).

In one or more embodiments of the invention, frames recorded onto the device can be uploaded to a server along with a metadata file describing the coordinates for each frame. The server processes these files and produces a deskewed video using the coordinates for each from the metadata file.

In one or more embodiments of the invention, when streaming images, images appear on a remote server at a unique URL. Users can change the aspect ratio of the streamed images at any time via a setting on the mobile application.

In one or more embodiments the aspect ratio of the streamed images can be automatically chosen by selecting an output aspect ratio most closely corresponding to the dimensions of the detected area from a fixed list of common aspect ratios (e.g.: 4:3 5:4 16:9).

In one or more embodiments of the invention, when the system is locked onto a screen boundary, it displays the unwarp image of the screen. Remote viewers of the stream can "annotate" their view, and their changes can be shown back onto the phone's display, for example to indicate procedures to follow. (e.g. remote help desk scenarios).

Figure 4:
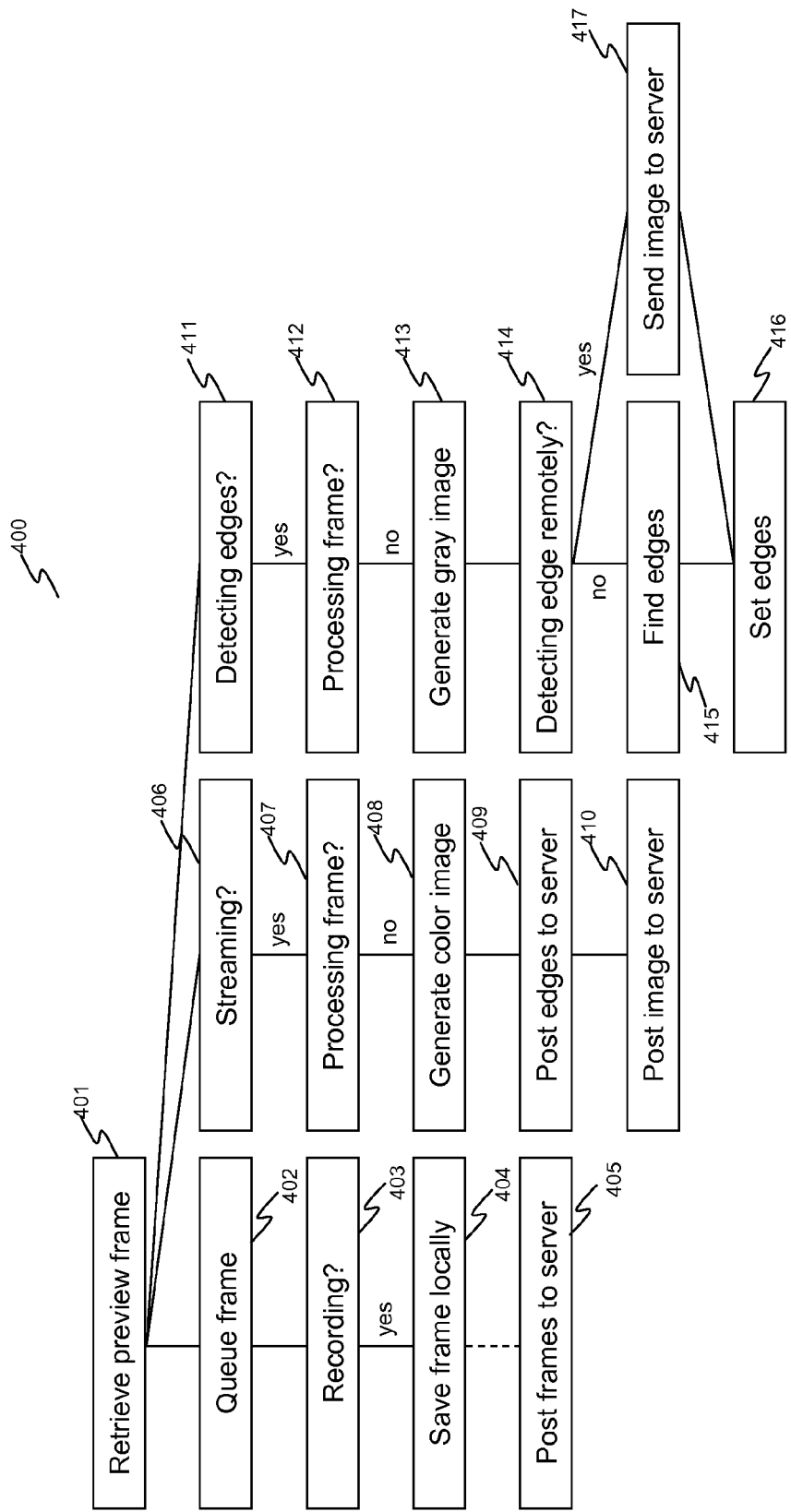
FIG. 4 illustrates an exemplary operating sequence of an embodiment of the invention comprising three executing threads.

In one or more embodiments of the invention, as shown in FIG. 4, the system runs three processing threads. In a first thread, the system first opens the camera and requests to receive preview frames (401). It stores received frames in a queue (402), and if it is in record mode (403) it saves queued images to a local file (404) and posts the frames to the server (405). It then pushes frame events to the other two threads.

In a second thread, a stream thread, the thread checks to see that it is in stream mode (406) and that it has processed the last event or frame (407). It then generates a compressed color image of the frame (408) and posts the image (410) and the edges of the detected display (409) to a remote server. This may also be processed in real time as the camera is receiving frames from the display.

In a third thread, a detection thread, the thread similarly checks that detection is enabled (411) and that it has processed the last frame (412). It then generates a grayscale image from the frame (413) before running a screen detection algorithm that finds the edges in the image (415) (configurable in the mobile interface). Depending on user-specified configuration parameters, the screen edge detection may be performed locally or remotely (414). The screen detection algorithm can include any combination of standard approaches to find quadrilateral shapes in images. One embodiment of this system includes both a simple luminance-based screen detector that can run on the local device, as well as an edge-detector-based screen detector running on a remote server (414). Once a candidate quadrilateral is found, it is set in the main thread and shown on the display. (e.g. as an overlay drawn over the actual video preview). The detected edges are set with respect to subsequent frames (416) and the image of the display is sent to the server (417). Additionally, cropping may be utilized to filter out all of the video information outside of the candidate quadrilateral so that only the screen information is sent to the server. This allows for the system to eliminate the background around the screen.

Exemplary Scenarios

In one or more embodiments of the invention, a reporter is given a demonstration of new software at a startup company and decides to record the screen using his cell-phone camera. An embodiment of the inventive system lets him generate a clean, bandwidth efficient upstream for his followers to see live or asynchronously.

In one or more embodiments of the invention, a business user wants to demonstrate a software application while sitting at a café. He starts an embodiment of the inventive application software on his phone and can stream only his screen to the remote participants; the embodiment of the inventive system will have cropped regions out of the screen, like the café surroundings or his cappuccino cup and croissant.

In one or more embodiments of the invention, a designer wants to document how a web page renders on his mobile device. He points his other cellphone to his mobile device's screen and starts recording using an embodiment of the inventive system. An embodiment of the inventive system picks up the mobile device's screen boundaries in the video stream, un-warps it and streams it to remote viewers.

In one or more embodiments of the invention, Alice is trying to send a FAX internationally using a multi-function device (MFD), but gets confused with the setup procedure. She calls up support, puts her phone on loud-speaker and points it to the MFD's LCD screen. The software automatically detects the boundaries of the LCD screen, un-warps its image and sends it to a support organization. The support personnel remotely draws over his view of the LCD screen, which is shown on Alice's phone-screen: now she know what options to choose.

In one or more embodiments of the invention, the system runs on an programmable mobile phone that has an accelerometer, and is implemented using the JAVA™ programming language. Accelerometer readouts are used to detect phone motion and enter or exit the locked-mode. In one or more embodiments of the invention, the server components use a rectangle detector based on Hough transforms to find the biggest rectangle in a given frame. In one or more embodiments of the invention, the detection of the display is based on LEDs positioned at the four corners of the screen to be detected, which allows for a robust, automatic detection of screen boundaries. The system can then search for luminance emitted from the positioned LEDs and interpolate the screen position based on the detected LEDs. In one or more embodiments of the invention, detecting the luminance emanating from the corners and/or the edges of the display may also be utilized. To further assist the system, the display may further utilize brightened corners and/or edges in order for the system to readily detect the display and interpolate the screen position.

Figure 5:
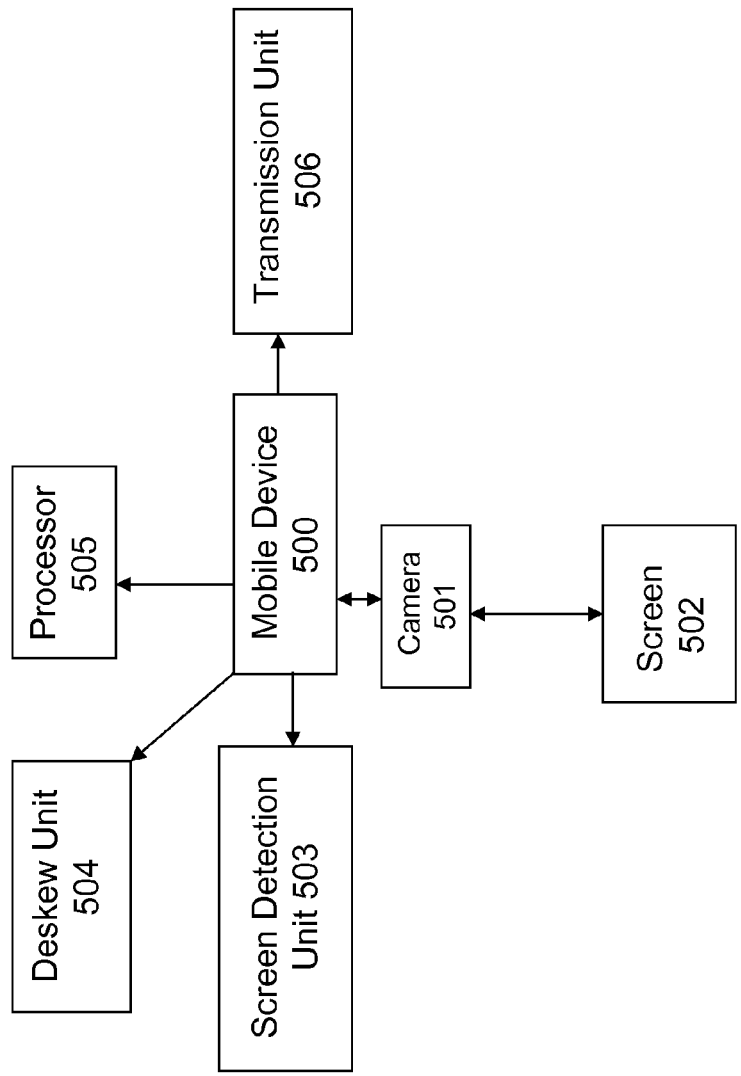
FIG. 5 illustrates an example functional diagram of an embodiment of the invention.

FIG. 5 illustrates an example functional diagram of an embodiment of the invention. The mobile device 500 is focused on a screen 502 through the camera 501. The screen detection unit 503 detects the screen and captures video frames from the camera and feeds the information to a processor 505. Because the camera may not be perfectly aligned with the captured screen, a deskew unit 504 may be used to deskew the video frames during the processing. The processing may involve identifying the screen via the screen detection unit and isolating the frame information related to the screen. After processing, the video frame may then be transmitted through the transmission unit 506 to a remote server.

The camera 501 typically will be integrated with the mobile device 500. Similarly, the screen detection unit 503, the deskew unit 504, the processor 505 and the transmission unit 506 can be integrated within the mobile device. Alternatively, the screen detection unit 503 and/or the deskew unit can be located remote from the mobile device 500, such as in another computer (not shown). In this alternative embodiment, the mobile devices 500 takes a picture of the screen 502 using camera 501, thereby creating an image of the screen. The mobile device 500 then sends the image to the computer using the transmission unit 506. The server, upon receiving the image, can use the screen detection unit 503 to detect the screen and the deskew unit 504 to deskew the image and return the deskewed image to the mobile device. Processing of the deskewed image can then proceed as discussed above.

Exemplary Mobile Platform

Figure 6:
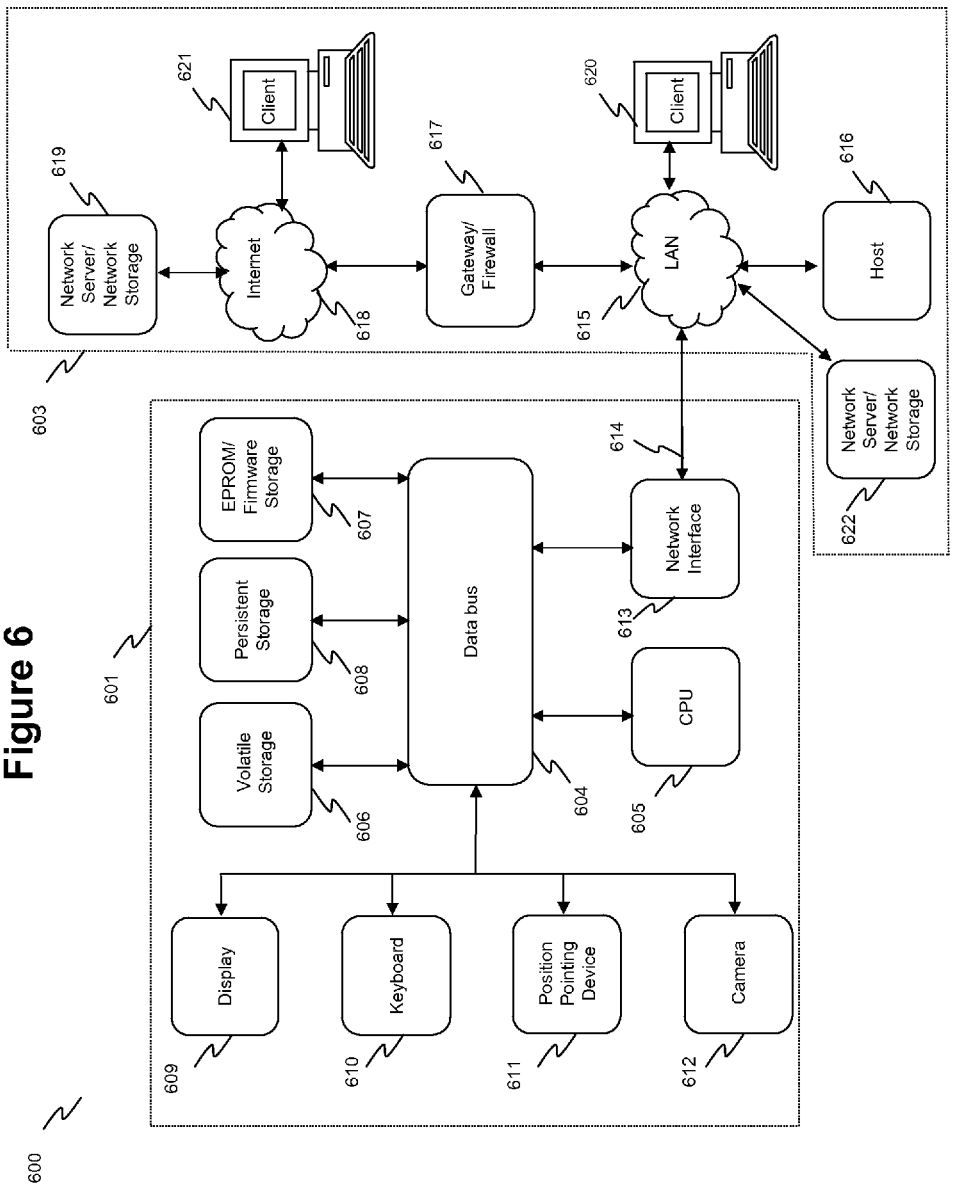
FIG. 6 illustrates an exemplary embodiment of a mobile device upon which the inventive system may be implemented.

FIG. 6 illustrates an exemplary embodiment 600 of a mobile device 601 connected via a network with a remote server system 603 upon which the inventive system may be implemented.

The mobile device 601 may include a data bus 605 or other communication mechanism for communicating information across and among various parts of the mobile device 601, and a processor 605 coupled with bus 601 for processing information and performing other computational and control tasks. Mobile device 601 also includes a volatile storage 606, such as a random access memory (RAM) or other dynamic storage device, coupled to bus 605 for storing various information as well as instructions to be executed by processor 605. The volatile storage 606 also may be used for storing temporary variables or other intermediate information during execution of instructions by processor 605. Mobile device 601 may further include a read only memory (ROM or EPROM) 607 or other static storage device coupled to bus 605 for storing static information and instructions for processor 605, such as basic input-output system (BIOS), as well as various system configuration parameters. A persistent storage device 608, such as a magnetic disk, optical disk, or solid-state flash memory device is provided and coupled to bus 604 for storing information and instructions.

Mobile device 601 may be coupled via bus 605 to a display 609, such as a cathode ray tube (CRT), plasma display, or a liquid crystal display (LCD), for displaying information to a system administrator or user of the mobile device 601. An input device 610, including alphanumeric and other keys, is coupled to bus 604 for communicating information and command selections to processor 605. Another type of user input device is cursor control device 611, such as a trackball, or cursor direction keys for communicating direction information and command selections to processor 605 and for controlling cursor movement on display 609. This input device typically has two degrees of freedom in two axes, a first axis (e.g., x) and a second axis (e.g., y), that allows the device to specify positions in a plane. A camera 612 may be coupled to the mobile device 601 via bus 605 to record a video of the display screen, as described above.

The invention is related to the use of mobile device 601 for implementing the techniques described herein. In an embodiment, the inventive system may reside on a machine such as mobile device 601. According to one embodiment of the invention, the techniques described herein are performed by mobile device 601 in response to processor 605 executing one or more sequences of one or more instructions contained in the volatile memory 606. Such instructions may be read into volatile memory 606 from another computer-readable medium, such as persistent storage device 608. Execution of the sequences of instructions contained in the volatile memory 606 causes processor 605 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 605 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 608. Volatile media includes dynamic memory, such as volatile storage 606.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 605 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 605. The bus 605 carries the data to the volatile storage 606, from which processor 605 retrieves and executes the instructions. The instructions received by the volatile memory 606 may optionally be stored on persistent storage device 608 either before or after execution by processor 605. The instructions may also be downloaded into the computer platform 601 via Internet using a variety of network data communication protocols well known in the art.

The mobile device 601 also includes a communication interface, such as network interface 613 coupled to the data bus 605. Communication interface 613 provides a two-way data communication coupling to a network link 615 that is coupled to a local network 615. For example, communication interface 613 may be a cellular telephone interface transmitting and receiving information over a cellular telephone network. In another embodiment, the communication interface 613 may be an integrated services digital network (ISDN) card or a modem to provide a data communication connection to a corresponding type of telephone line. In yet another embodiment, communication interface 613 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 613 sends and receives electrical, electromagnetic or optical signals that carry digital data streams representing various types of information.

Network link 613 typically provides data communication through one or more networks to other network resources. For example, network link 615 may provide a connection through local network 615 to a host computer 616, or a network storage/server 617. Additionally or alternatively, the network link 613 may connect through gateway/firewall 617 to the wide-area or global network 618, such as an Internet. Thus, the mobile device 601 can access network resources located anywhere on the Internet 618, such as a remote network storage/server 619. On the other hand, the mobile device 601 may also be accessed by clients located anywhere on the local area network 615 and/or the Internet 618. The network clients 620 and 621 may themselves be implemented based on the computer platform similar to the platform 601.

Local network 615 and the Internet 618 both use electrical, electromagnetic or optical signals that carry digital data streams. The signals through the various networks and the signals on network link 615 and through communication interface 613, which carry the digital data to and from the mobile device 601, are exemplary forms of carrier waves transporting the information.

Mobile device 601 can send messages and receive data, including program code, through the variety of network(s) including a cellular telephone network, Internet 618 and LAN 615, network link 615 and communication interface 613. In the Internet example, when the system 601 acts as a network server, it might transmit a requested code or data for an application program running on client(s) 620 and/or 621 through Internet 618, gateway/firewall 617, local area network 615 and communication interface 613. Similarly, it may receive code from other network resources.

The received code may be executed by processor 605 as it is received, and/or stored in persistent or volatile storage devices 608 and 606, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, JAVA™, etc.

Moreover, other implementations of the invention will be apparent to those skilled in the art from consideration of the specification and practice of the invention disclosed herein.

Various aspects and/or components of the described embodiments may be used singly or in any combination in the systems and methods for streaming content of displays inside video using a mobile device. It is intended that the specification and examples be considered as exemplary only, with a true scope and spirit of the invention being indicated by the following claims.

What is claimed is:

1. A computer-implemented method for streaming a content of a display screen, the method being performed by a mobile device, the method comprising:
    capturing a video frame including the display screen using a camera of the mobile device;
    detecting an area within the video frame corresponding to the display screen;
    processing the video frame based on the detected area, by deskewing a portion of the video frame by changing boundaries of the detected area to unwarp the portion of the video frame;
    locking coordinates of the detected area in a lock mode to form a reference frame, wherein, during the lock mode, detecting the area within the video frame ceases, changing the boundaries of the detected area no longer changes, and the reference frame is presented as a preview image in a corner of a screen of the mobile device,
    wherein the method further comprises
    aligning subsequent frames to the reference frame, and
    detecting a change in a pose of the camera and, upon the detection of the change in pose, exiting the locked mode and re-detecting an area within the video frame.

2. The computer-implemented method of claim 1, wherein the area within the video frame is detected using luminance from the display screen.

3. The computer-implemented method of claim 1, wherein the area within the video frame is detected by detecting edges of the display screen within the video frame.

4. The computer-implemented method of claim 1, wherein the area within the video frame is detected by detecting corners of the display screen within the video frame.

5. The computer-implemented method of claim 4, wherein the corners of the display screen are detected by detecting luminance from each corner of the display screen.

6. The computer-implemented method of claim 1, wherein the area within the video frame is detected by setting locations of corners of the display screen within the video frame, the locations of the corners of the display screen being specified by a user.

7. The computer-implemented method of claim 6, wherein the locations of the corners are set according to locations on the screen of the mobile device that are touched by the user.

8. The computer-implemented method of claim 1, wherein the deskewing is performed based on an aspect ratio.

9. The computer-implemented method of claim 8, wherein the aspect ratio is automatically estimated.

10. The computer-implemented method of claim 1, further comprising performing a motion correction on the portion of the video frame within the detected area.

11. The computer-implemented method of claim 10, wherein the motion correction is optical motion correction.

12. The computer-implemented method of claim 1, wherein the processing further comprises filtering out of a second portion of the video frame outside of the detected area.

13. The computer-implemented method of claim 12, wherein the filtering is performed based on an aspect ratio.

14. The computer-implemented method of claim 13, wherein the aspect ratio is specified by a user.

15. The computer-implemented method of claim 1, further comprising setting the detected area to a rectangle if the user is determined to have touched two locations of the screen of the mobile device in a rapid succession.

16. The computer-implemented method of claim 1, wherein, after the video frame is processed, the unwarped portion of the video frame is transmitted to a remote server in real time.

17. The computer-implemented method of claim 1, wherein the subsequent frames are aligned to the reference frame based on feature points at the boundaries of the detected area.

18. The computer-implemented method of claim 1, further comprising storing the processed video frame in a local storage area of the mobile device.

19. The computer-implemented method of claim 1, wherein the display screen is one of a computer display screen, a video display screen, a TV screen, an appliance display screen, a mobile device screen, or a multifunction device screen.

20. A non-transitory computer-readable medium embodying a set of instructions, which, when executed by one of more processing units of a mobile device, cause the mobile device to perform a method comprising:
    capturing a video frame including a display screen using a camera of the mobile device;
    detecting an area within the video frame corresponding to the display screen;
    deskewing a portion of the video frame by changing the boundaries of the detected area to unwarp the portion of the video frame;
    locking coordinates of the detected area in a lock mode to form a reference frame, wherein, during the lock mode, detecting the area within the video frame ceases and changing the boundaries of the detected area no longer changes, and the reference frame is presented as a preview image in a corner of a screen of the mobile device;
    wherein the method further comprises
    aligning subsequent frames to the reference frame, and
    detecting a change in a pose of the camera and, upon the detection of the change in pose, exiting the locked mode and re-detecting an area within the video frame.

21. A computer-implemented method for streaming a content of a display screen, the method comprising:
    capturing, by a mobile device, a video frame including the display screen using a camera of the mobile device;
    detecting an area within the video frame corresponding to the display screen;
    sending, to a remote server, the video frame and boundary coordinates of the detected area;
    receiving, from the remote server, a video frame in which a portion of the video frame within the detected area has been deskewed by changing the boundary coordinates of the detected area to unwarp the portion of the video frame;
    locking the detected area of the received video frame in a locked mode to form a reference frame, wherein, during the locked mode, detecting the area within the video frame ceases, and the reference frame is presented as a preview image in a corner of a screen of the mobile device;
    the method further comprising
    aligning subsequent frames to the reference frame; and
    detecting a change in a pose of the mobile device and, upon the detection of the change in pose, exiting the locked mode and re-detecting an area within the video frame.

* * * * *